3,476,572
BUTTER-FLAVORED SALT
Barbara Dros, Lyons, and Eric Engel, Winnetka, Ill., assignors, by mesne assignments, to SCM Corporation, New York, N.Y., a corporation of New York
No Drawing. Filed Nov. 30, 1966, Ser. No. 597,857
Int. Cl. A23l 1/22
U.S. Cl. 99—143                3 Claims

ABSTRACT OF THE DISCLOSURE

A butter-flavored salt composition comprising an intimate mixture of principally salt, a small amount of butter flavor and .5 to 20% of an intimately dispersed "sharp melting" edible non-butterfat having a Wiley melting point range of about 95° F. to 120° F.

---

This invention relates to a condiment useful for the flavoring of food, and more particularly, to a butter-flavored salt.

It will be recognized that a combination of salt and butter flavor for use on items such as vegetables, noodles, and popcorn would not only be a great convenience, but would possess the additional advantage of enabling the user to achieve a more uniform mixture of the condiment and food to be seasoned. For example, butter is usually added to popcorn followed by a sprinkling of salt. The salt normally adheres best to those individual pieces of the corn that have received a butter coating. This results in a high concentration of salt in a portion of the whole mass and none in others. By the use of the improved condiment of this invention, uniformity of salting and flavoring can be more readily obtained.

In devising such a product, intimate mixtures of only salt, butter color and butter flavor were found to have low butter flavor in relation to the amount of salt, accompanied by an undesirable mottled appearance. Additionally, this mixture failed to coat food in the desired, substantially uniform manner and still resulted in local high and low concentrations of salt. Further, because it is contemplated that the product of the invention would be most useful in a shaker-type container, free-flowing properties were desired, and caking occurred in varying degree with these prior preparations.

Surprisingly, it has been found that intimately dispersing a small proportion of edible non-butterfat having a Wiley melting point of about 95° F. to about 120° F. can produce a free-flowing product that is a homogeneous mixture to the naked eye and has a pleasing appearance and ingestion characteristics and a much more desirable relationship between the intensity of butter flavor and saltiness.

Ingredients for the composition of this invention have heretofore been mentioned in general terms and specific alternatives in each class will readily occur to those skilled in the art. The ingredients will be chosen from among a great variety available that will conform to the regulations of the U.S. Food and Drug Administration and that are not injurious to the health of the consumer, since the composition of this invention is primarily intended for human consumption. By way of illustration and not limitation, the following are suggested:

The term "salt" as employed in this disclosure refers principally to sodium chloride or common table salt. However, the salt may include other ingredients such as iodine, noncaking agents, and the like, of a type which is prepared and sold for use in kitchens or at the table.

Anticaking agents will often be found in a mixture with commercial salt preparations. They can be added as desired. If a spray dried butter is employed as the flavor agent, such agents must be present to impart good flow ability to the product. A considerable variety of such agents may be found by reference to U.S. Patent Office Class 99—143. Tricalcium phosphate and sodium aluminum silicate have been found particularly suitable for use in the compositions of this invention.

Non-butterfats useful in making butter-flavored salt have been used in confectioners' coatings. In general, they can be of vegetable, animal, or mixed vegetable-animal origin and often they are hydrogenated. They are characterized by having a Wiley melting point in the range of about 95° F. to about 120° F., and exhibit sharp melting characteristics. Those skilled in the art will recognize the term "sharp melting" as referring to a virtually nonplastic fat exhibiting a rapid decline in the solid fat index (i.e., solids content index) in the temperature range of 90° F. to 105° F., and that will not soften appreciably at temperatures normal to the temperate zone.

While a single non-butterfat fraction may be obtained having the desired melting characteristics, the factor of commercial availability will normally dictate a blend of fats to achieve optimum melting characteristics. The melting point selected is dependent to some extent on the concentration of such fat to be employed. At low concentration of, say ½ percent by condiment weight, fat having a Wiley melting point of 95° F. produces a reasonable cake resistance; at a 20 percent level fat having a Wiley melting point of 120° F. will better resist caking. What is desired is a melting point high enough to prevent softening and caking at moderate ambient temperatures, which will reduce the flowability of the product. If the end use of the salt is to season foods that normally are served quite hot, such as whipped potatoes, a non-butterfat in the high part of the specified melting range can be employed satisfactorily. Conversely, lower melting ones are preferred for seasoning foods that are permitted to cool considerably before ingestion thereby better avoiding a "waxy" feeling in the mouth or other loss of palatability. This fat will be present at about 2 to 16 percent concentration and having a Wiley melting point of about 95 to 105° F. to provide an advantageous balance between caking resistance and broad palatability, and preferably such fat will have a Wiley melting point of 95°–100° F.

Because suitability and appeal of a food or condiment is a highly subjective factor, it is impractical to give precisely optimum values within the broad range disclosed. However, a composition as shown in the example was found to give a product that was a good compromise between opposing variables and acceptable for use under normal environmental conditions.

The preferred method of making the condiment of this invention is to mechanically blend the ingredients, at room temperature, in fine particulate state, until substantial homogeneity appears to the naked eye. Under a microscope, the resulting product appears to be a slightly aggregated mixture of large, white, opaque particles and smaller yellow colored particles. Alternatively, a mixture of these ingredients can be agitated with the application of heat until most, or all, of the fats present melt. This mixture may then be cooled and comminuted.

Conventional artificial butter flavors that can be used are diacetyl 2,3-butanedione in combination with either butter acids such as butyric acid, isobutyric acid, caproic acid, butter esters, or butter starter distillate which may contain minor amounts of aldehydes and ketones, singly or in combination and a spray-dried butter. Generally, if used alone the artificial flavor is used at a concentration not substantially in excess of 1 to 2 percent but more may be used if desired. For the purposes of this invention, spray dried butter can be considered to be a butter flavor, which can be reinforced by a minute proportion of artificial flavor. In this instance, 5 to 15 percent spray dried butter may be employed or more preferably, considering efficiency and economy, 10 percent. If spray dried butter is used alone as the flavor agent, a much greater proportion must be used.

Artificial butter color can be imparted by the use of annatto extract or beta carotene. Certified dyes suitable for this purpose are illustrated by French 140 No. 3, Yellow 90 Shade 173, FD & C Yellow No. 5 which is a trisodium salt of 3-carboxy-5-hydroxy-1-para-sulfophenyl-4-p-sulfophenylazopyrazole, and Lake Yellow No. 5.

While certain representative embodiments and details are shown in the following example for the purpose of illustrating the invention, it will be apparent to those skilled in this art that various changes and modifications may be made therein without departing from the spirit or scope of the invention.

EXAMPLE

The ingredients shown in the table were dry mixed in particulate state at room temperature until a visually uniform color was obtained. The product was free flowing at room temperature when employed in a shaker top jar. A test panel to whom the product was submitted rated it highly acceptable in flavor and esthetic appeal. The stearin vegetable fraction employed has a Wiley melting point of 97° F.±2° F.

Table

| | Parts |
|---|---|
| Salt | 82.69 |
| Stearin veg. fraction | 6.00 |
| Spray-dried butter | 10.00 |
| Artificial butter flavor | 0.5 |
| Tricalcium phosphate | 0.75 |
| Lake Yellow No. 5 | 0.06 |

What is claimed is:

1. An improved butter-flavored salt comprising an intimate mixture of principally salt, at least a threshold amount of butter flavor, and about ½–20% of a sharp melting non-butterfat having Wiley melting point between about 95° F. and about 120° F.

2. The composition according to claim 1 wherein at least a part of the butter flavor is contributed by spray-dried butter, and a salt anticaking agent is present.

3. The composition according to claim 1 having artificial butter color present.

References Cited
UNITED STATES PATENTS

| | | | |
|---|---|---|---|
| 1,140,995 | 5/1915 | Miller | 99—143 |
| 2,404,037 | 7/1946 | Buxton | 99—140 |
| 3,038,807 | 6/1962 | Cathcart et al. | 99—140 |
| 3,118,771 | 1/1964 | Albrecht | 99—143 |
| 3,190,753 | 6/1965 | Claus et al. | 99—140 X |

A. LOUIS MONACELL, Primary Examiner

D. M. NAFF, Assistant Examiner

U.S. Cl. X.R.

99—140